(12) United States Patent
Chang et al.

(10) Patent No.: US 8,238,375 B2
(45) Date of Patent: Aug. 7, 2012

(54) METHOD AND APPARATUS FOR TRANSMITTING BROADCASTING INFORMATION

(75) Inventors: Sung Cheol Chang, Daejeon (KR); Kwang Jae Lim, Daejeon (KR); Jae Sun Cha, Daejeon (KR); Sung Kyung Kim, Daejeon (KR); Chul Sik Yoon, Seoul (KR)

(73) Assignees: Samsung Electronics Co., Ltd, Suwon-si (KR); Electronics and Telecommunications Research Institute, Daejeon (KR)

( * ) Notice: Subject to any disclaimer, the term of this patent is extended or adjusted under 35 U.S.C. 154(b) by 703 days.

(21) Appl. No.: 12/394,887

(22) Filed: Feb. 27, 2009

(65) Prior Publication Data

US 2010/0220691 A1 Sep. 2, 2010

(51) Int. Cl.
*H04H 20/28* (2008.01)
(52) U.S. Cl. ......... 370/487; 370/329; 370/432; 370/458
(58) Field of Classification Search .................. 370/329, 370/352, 432, 442–444, 458, 459, 466, 468, 370/487
See application file for complete search history.

(56) References Cited

U.S. PATENT DOCUMENTS

| | | | | |
|---|---|---|---|---|
| 7,633,926 | B1* | 12/2009 | Sethi et al. | 370/349 |
| 2003/0235185 | A1* | 12/2003 | Gibbs et al. | 370/352 |
| 2004/0076171 | A1* | 4/2004 | Levi et al. | 370/442 |
| 2005/0002346 | A1* | 1/2005 | Bichot | 370/312 |
| 2005/0117602 | A1* | 6/2005 | Carrigan et al. | 370/466 |
| 2007/0047483 | A1* | 3/2007 | Khan | 370/328 |

FOREIGN PATENT DOCUMENTS

| | | |
|---|---|---|
| KR | 10-2008-0071855 A | 8/2008 |
| KR | 10-2008-0071904 A | 8/2008 |

OTHER PUBLICATIONS

Sungcheol Chang et al., A DL Control Structure in IEEE 802.16m, IEEE 802.16 Broadband Wireless Access Working Group, Mar. 10, 2008.

\* cited by examiner

*Primary Examiner* — Andrew Lai

(57) ABSTRACT

In a method of transmitting broadcasting information, the broadcasting information is classified into fixed broadcasting information for transmitting to a fixed position of a superframe and variable broadcasting information to be variably transmitted in the form of a broadcasting message. The fixed broadcasting information may be classified into primary broadcasting information having a short cycle and secondary broadcasting information having a long cycle.

21 Claims, 4 Drawing Sheets

METHOD AND APPARATUS FOR TRANSMITTING BROADCASTING INFORMATION

BACKGROUND (a) Field

The present invention relates to a method and an apparatus for transmitting broadcasting information.

(b) Description of the Related Art

In a wireless communication system, a base station provides broadcasting information, for example system parameters and system configuration information, to a terminal. The terminal decodes the broadcasting information to find the system parameter, the system configuration information, and so on.

Although the terminal does not require some broadcasting information, when the base station transmits the broadcasting information to the terminal through a resource to be dynamically allocated, the terminal confirms all of the broadcasting information by constantly confirming resource allocation information. Furthermore, all of the broadcasting information is transmitted according to the same broadcasting cycle. Then, the terminal can be extremely time-consuming in acquiring the broadcasting information, thereby being low in efficiency.

The above information disclosed in this Background section is only for enhancement of understanding of the background of the invention and therefore it may contain information that does not form the prior art that is already known in this country to a person of ordinary skill in the art.

SUMMARY

According to embodiments of the present invention, a method and an apparatus for efficiently transmitting broadcasting information are provided.

According to an embodiment of the present invention, a method of transmitting broadcasting information in a broadcasting information transmission apparatus is provided. The method includes classifying the broadcasting information into first broadcasting information and second broadcasting information, transmitting the first broadcasting information at a fixed position of a super-frame, and transmitting the second broadcasting information in the form of a broadcasting message.

According to another embodiment of the present invention, a method of transmitting broadcasting information in a broadcasting information transmission apparatus is provided. The method includes classifying the broadcasting information into primary broadcasting information and secondary broadcasting information, allocating the primary broadcasting information to each of super-frames, dividing the secondary broadcasting information into a plurality of secondary broadcasting blocks, and allocating the plurality of secondary broadcasting blocks to a plurality of super-frames, respectively.

According to yet another embodiment of the present invention, an apparatus for transmitting broadcasting information is provided. The apparatus includes a broadcasting information classification unit, a frame configuration unit, and a frame transmitting unit. The broadcasting information classification classifies broadcasting information into primary broadcasting information and secondary broadcasting information. The frame configuration unit locates the primary broadcasting information and the secondary broadcasting information at a fixed position of a super-frame, and the frame transmitting unit transmits the super-frame.

DETAILED DESCRIPTION OF THE EMBODIMENTS

Figure 1:
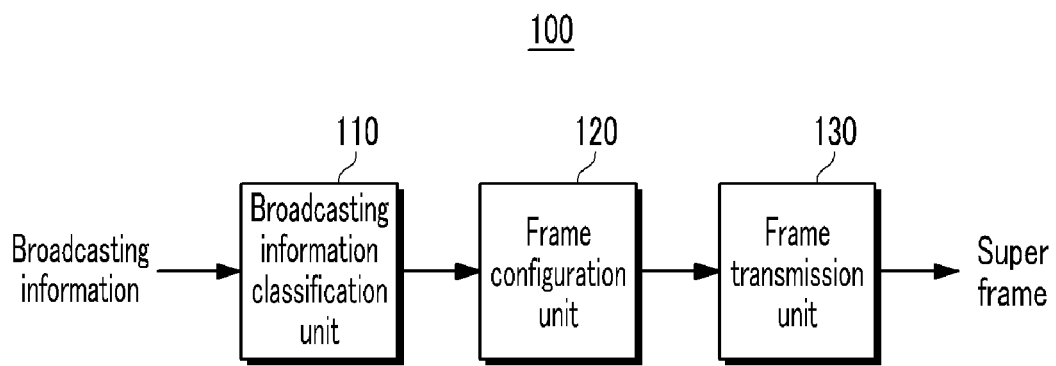
FIG. 1 is a schematic block diagram of a broadcasting information transmission apparatus according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word 'comprise' and variations such as 'comprises' or 'comprising' will be understood to imply the inclusion of stated elements but not the exclusion of any other elements. In addition, the terms 'unit' described in the specification mean units for processing at least one function and operation, and can be implemented by hardware components or software components and combinations thereof.

In this specification, a terminal may designate a mobile station (MS), a mobile terminal (MT), a subscriber station (SS), a portable subscriber station (PSS), user equipment (UE), an access terminal (AT), and so on. Moreover, the mobile station may include all or a part of functions of the mobile station, the mobile terminal, the subscriber station, the portable subscriber station, the user equipment, the access terminal, and so on.

Furthermore, in this specification, a base station (BS) may designate an access point (AP), a radio access station (RAS), a node B, an evolved node B (eNode B), a base transceiver station (BTS), a mobile multihop relay base station (MMR-BS), and so on. Moreover, the base station may include all or a part of functions of the access point, the radio access station, the node B, the eNode B, the base transceiver station, the MMR-BS, and so on.

A method and an apparatus for transmitting broadcasting information according to an embodiment of the present invention will now be described in detail with reference to the drawings.

Figure 2:
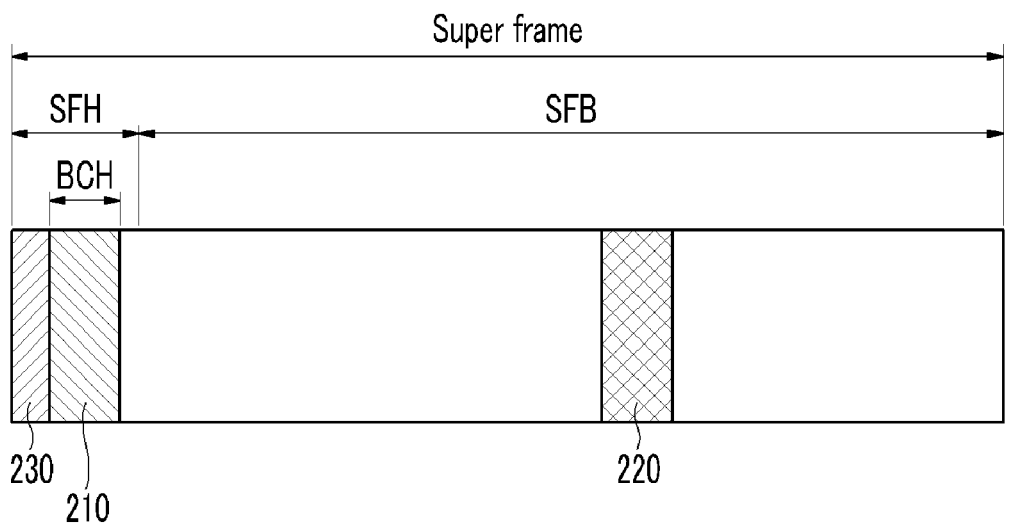
FIG. 2 to FIG. 6 are drawings schematically illustrating a configuration of a super-frame according to embodiments of the present invention, respectively.
Figure 3:
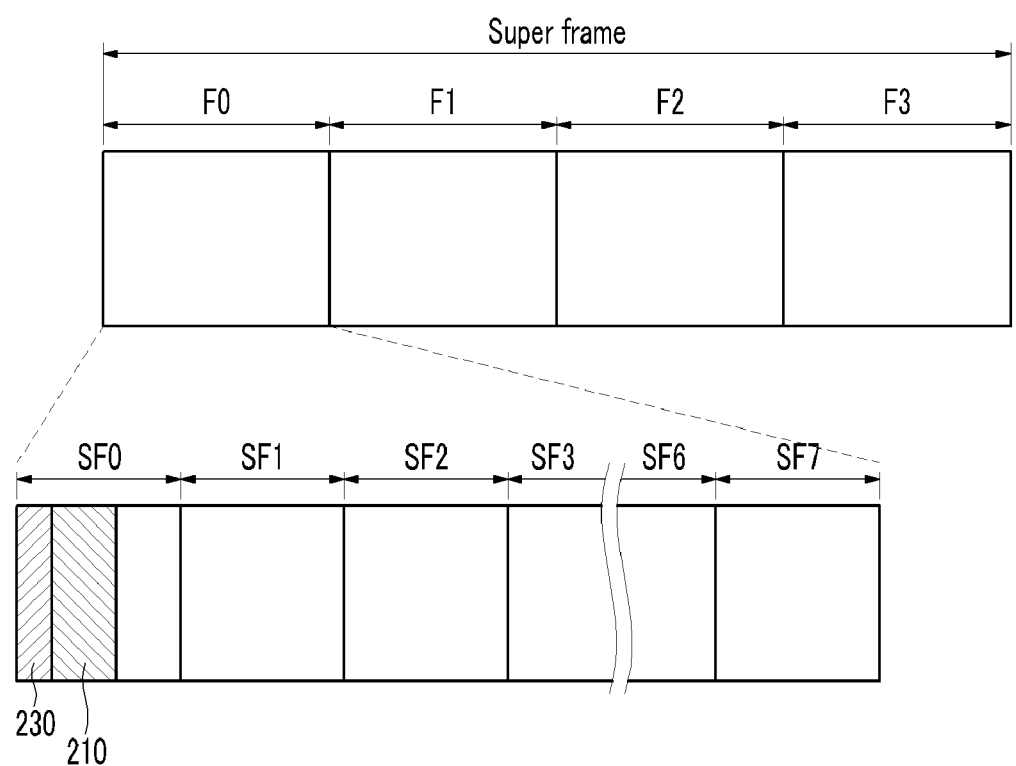

FIG. 1 is a schematic block diagram of a broadcasting information transmission apparatus according to an embodiment of the present invention, and FIG. 2 and FIG. 3 are views schematically illustrating a configuration of a super-frame according to an embodiment of the present invention, respectively.

Referring to FIG. 1, a broadcasting information transmission apparatus 100 includes a broadcasting information classification unit 110, a frame configuration unit 120, and a frame transmission unit 130. Here, the broadcasting information transmission apparatus 100 may be included in the base station of a wireless communication system.

The broadcasting information classification unit 110 classifies broadcasting information into fixed broadcasting information for transmitting fixedly and variable broadcasting information for transmitting variably. The fixed broadcasting information may include cell operation information.

The frame configuration unit 120 allocates the fixed broadcasting information to a predetermined fixed position of every super-frame, and allocates the variable broadcasting information to a data transmission portion of the super-frame in the form of a broadcasting message. This variable broadcasting information may be variably allocated to at least one of a plurality of continuous super-frames. The fixed broadcasting information may indicate whether the variable broadcasting information exists in the relevant super-frame or not.

The frame transmission unit 130 transmits a super-frame configured by the frame configuration unit 120.

Then, the terminal can acquire the fixed broadcasting information through the fixed position of the super-frame without decoding resource allocation information in the super-frame to rapidly acquire the cell operation information.

Referring to FIG. 2, the super-frame includes a super-frame header SFH and a super-frame body SFB. The super-frame header SFH is located in front of the super-frame body SFB.

The frame configuration unit 120 allocates the fixed broadcasting information 210 to a broadcasting channel BCH within the super-frame header SFH and allocates the variable broadcasting information 220 to the super-frame body SFB.

The frame configuration unit 120 may additionally allocate a preamble 230 to the super-frame header SFH. In this case, the preamble 230 may be located in front of the fixed broadcasting information 210. That is, all of the super-frames may start from the preamble 230 that can be used for synchronization acquisition.

Referring to FIG. 3, the super-frame may include a plurality of temporally continuous frames, for example, four frames F0 to F3. Each of the frames F0 to F3 may include a plurality of temporally continuous subframes, for example, eight subframes SF0 to SF7. Moreover, each of the subframes SF0 to SF7 may include a plurality of temporally continuous symbols (not shown), for example, a plurality of orthogonal frequency division multiplexing (OFDM) symbols. In this case, the fixed broadcasting information 210 and the preamble 230 may be located on the first subframe SF0 of the first frame F0 among the plurality of frames F0 to F3.

Hereinafter, information allocated to the fixed broadcasting information by the broadcasting information transmission apparatus and an operation of the terminal will be described.

According to an embodiment, the fixed broadcasting information may include a version of a currently-transmitted broadcasting message and a version of a currently-applied broadcasting message. The version of the currently-applied broadcasting message may be applied in the range of the current super-frame. In this case, the terminal receives the broadcasting messages, classifies the received broadcasting messages for each version, and stores them. When the terminal acquires the version of the broadcasting message that is applied to the current super-frame, it receives data of the super-frame by utilizing this broadcasting message.

According to an embodiment, the fixed broadcasting information may include a broadcasting message change indicator for indicating that the broadcasting message to be transmitted is different from the currently applied broadcasting message. In this case, only one version of the broadcasting message to be transmitted may be different from the version of the currently applied broadcasting message. This broadcasting message change indicator indicates that the broadcasting message different from the currently applied broadcasting message is transmitted. Therefore, when the indicator is set, the terminal receives this broadcasting message. After this, although the indicator is set, if the same version of the broadcasting message is applied, the terminal does not receive a new broadcasting message. If the super-frame of a new version appears, the setting of the broadcasting message change indicator is released. Meanwhile, when the broadcasting information change indicator is not set, that is, when the setting of the broadcasting information change indicator is released, broadcasting information that is the same as the currently applied broadcasting information is to be transmitted. Accordingly, the terminal may not receive the broadcasting message.

When the broadcasting message is changed, the frame configuration unit 120 may allocate schedule information indicating the position of the broadcasting message to the fixed broadcasting information in order to save electric power while receiving the broadcasting message. When the terminal acquires a position of the next broadcasting message through the fixed broadcasting information, it may not conduct a receive operation for receiving the broadcasting message up to the position. Meanwhile, the broadcasting information transmission apparatus 100 may transmit information of the super-frame on which the next broadcasting message is located at the scheduled position instead of not transmitting the broadcasting message at the scheduled position, in accordance with utilization of the resource. Then, the terminal confirms that position information of the broadcasting message is changed at the scheduled position, and then may receive the broadcasting message after waiting up to the changed position.

According to an embodiment, the variable broadcasting information may be formed by a plurality of broadcasting messages, and the broadcasting information classification unit 110 may manage the version for each broadcasting message. In this case, the fixed broadcasting information may include the version for each broadcasting message and include the indicator for each broadcasting message. Accordingly, the terminal determines whether the broadcasting information is changed or not, through the indicator for each broadcasting message. When the broadcasting information is not changed, the terminal may not receive the corresponding broadcasting message.

According to an embodiment, the variable broadcasting information may be formed by a plurality of broadcasting messages, and the broadcasting information classification unit 110 manages the plurality of broadcasting messages with one version to save the resource of the broadcasting information. In this case, if any one of the plural broadcasting messages is changed, the common version is changed. As a result, the terminal receives all broadcasting messages and decodes the received broadcasting messages, thereby processing the broadcasting message.

Figure 4:
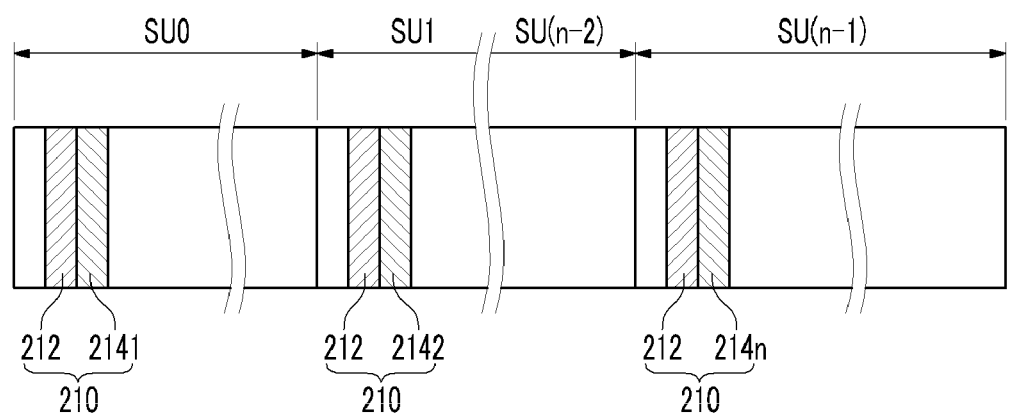

FIG. 4 is a view schematically illustrating a configuration of the super-frame according to an embodiment of the present invention.

Referring to FIG. 4, broadcasting information classification unit 110 (see FIG. 1) can classifies the broadcasting information into a plurality of blocks including a primary broadcasting block 212 for transmitting primary broadcasting information, and at least one secondary broadcasting blocks 2141 to 214n for transmitting secondary broadcasting information. In this case, a cycle of the primary broadcasting information may be different from a cycle of the secondary broadcasting information. For example, the primary broadcasting block 212 is transmitted on every frame, and the plurality of secondary broadcasting blocks 2141 to 214n may be transmitted on n (n is an integer of 2 or more) super-frames SU0 to SU(n−1), respectively. That is, the transmission cycle of the primary broadcasting information corresponds to one super-frame, and the transmission cycle of the secondary broadcasting information corresponds to n super-frames. In this case, the terminal receives n super-frames, connects n secondary broadcasting blocks to each other, and decodes them. As a result, the terminal can acquire the secondary broadcasting information.

Meanwhile, as described with reference to FIG. 1, the broadcasting information classification unit 110 classifies the broadcasting information into the fixed broadcasting information 210 (see FIG. 1) and the variable broadcasting information 220 (see FIG. 1), and may then classify the fixed broadcasting information 210 into the primary broadcasting information and the at least one secondary broadcasting information.

The frame configuration unit 120 (see FIG. 1) can locate the primary broadcasting block 212 in front of the secondary broadcasting blocks 2141 to 214n at a broadcasting channel of the super-frame. Furthermore, the frame configuration unit 120 may separate the primary broadcasting block and the secondary broadcasting block at a time domain to dispose them in the form of time division multiplexing (TDM).

The broadcasting information classification unit 110 may classify broadcasting information that is rapidly acquired by the terminal or is rapidly changed into the primary broadcasting information. On the other hand, the broadcasting information classification unit 110 may classify broadcasting information that is slowly acquired by the terminal or is slowly changed compared to the primary broadcasting information into the secondary broadcasting information. In an embodiment, since the primary broadcasting information is formed by the same information at a cell area, the terminal in the vicinity of cell boundary can obtain a diversity effect while receiving the primary broadcasting information. In addition, the secondary broadcasting information may be formed by the same information at a network area.

For example, the primary broadcasting information may include the broadcasting message version for indicating the version of the secondary broadcasting information and/or the version of the broadcasting message or the broadcasting message change indicator for indicating the change of the secondary broadcasting information and/or the broadcasting message. The primary broadcasting information may include at least one of a low-order bit of a super-frame number, a version of the primary broadcasting information, fast frame control information, a super-frame offset for the broadcasting message, and a paging message indicator. The broadcasting message version may include at least one of a secondary broadcasting block counter, a downlink channel descriptor (DCD) counter, an uplink channel descriptor (UCD) counter, and a neighbor advertisement (NBR-ADV) counter. The broadcasting message change indicator may include at least one of a secondary broadcasting block change indicator, a DCD change indicator, an UCD change indicator, and an NBR-ADV change indicator.

Furthermore, the secondary broadcasting information may include at least one of a secondary broadcasting block counter, a high-order bit of the super-frame number, transmission configuration information, frame and downlink subframe configuration information, the maximum number of MAPs, modulation and coding scheme (MCS) definition of the MAPs, and multi-carrier information.

Figure 5:
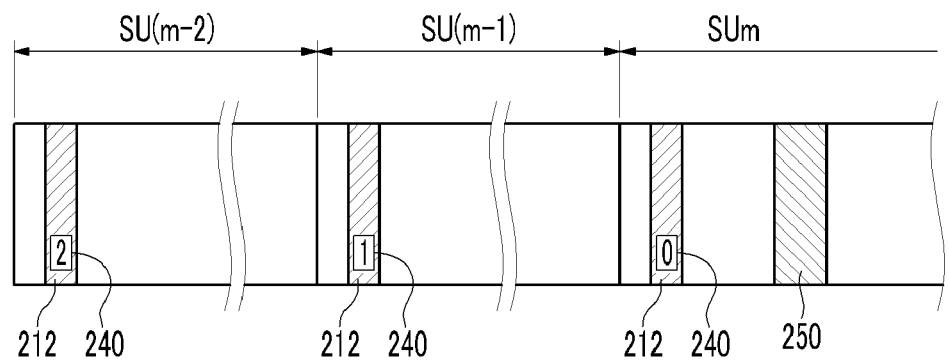

FIG. 5 is a view schematically illustrating the configuration of the super-frame according to another embodiment of the present invention.

Referring to FIG. 5, the frame configuration unit 120 (see FIG. 1) allocates the broadcasting message to a body of a specified super-frame. Moreover, the frame configuration unit 120 allocates a super-frame offset 240 for indicating the position of the super-frame to which the broadcasting message 250 belongs to the fixed broadcasting information of each super-frame. In this case, as described above, the super-frame offset 240 for the broadcasting message 250 may be allocated to primary broadcasting information 212 of the fixed broadcasting information.

In detail, the super-frame offset 240 allocated to the primary broadcasting information 212 of the super-frame to which the broadcasting message 250 belongs is set to '0'. Moreover, the super-frame offset 240 of the primary broadcasting information 212 of the previous super-frame is set to a value that increases by '1'. For example, when the broadcasting message 250 exists in an m-th super-frame SUm, the super-frame offsets 240 of the m-th, (m−1)-th, and (m−2)-th super-frames SUm, SU(m−1), and SU(m−2) may be set to '0', '1', and '2', respectively. Then, the terminal acquires the primary broadcasting information 212 to determine which super-frame includes the broadcasting message henceforth. Moreover, when the super-frame offset 240 of the primary broadcasting information 212 is '0', the terminal can know that the broadcasting message 250 is located on the corresponding super-frame. Accordingly, the terminal confirms the super-frame to which the broadcasting message 250 belongs and decodes the body of the corresponding super-frame, and can efficiently acquire the broadcasting message.

Figure 6:
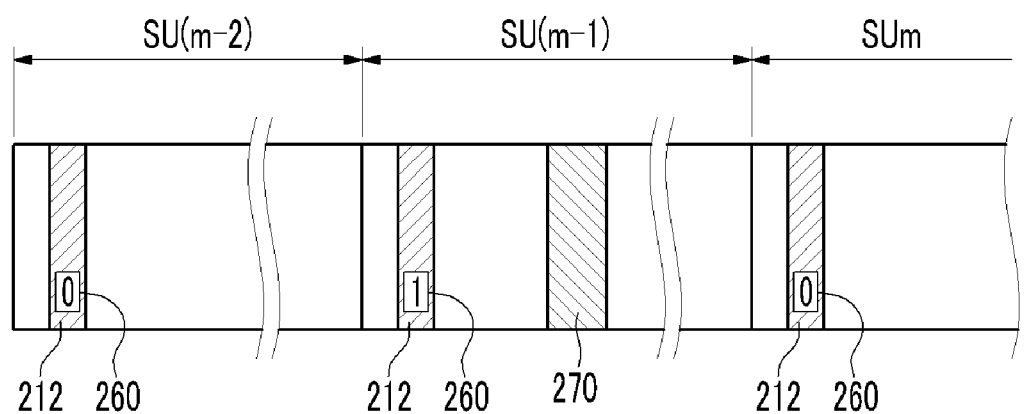

FIG. 6 is a view schematically illustrating the configuration of the super-frame according to another embodiment of the present invention.

Referring to FIG. 6, the frame configuration unit 120 (see FIG. 1) allocates a paging message 270 to the body of the specified super-frame. Moreover, the frame configuration unit 120 allocates a paging message indicator 260 for indicating whether the paging message exists in the corresponding super-frame to the fixed broadcasting information of each super-frame. In this case, as described above, the paging message indicator 260 may be allocated to the primary broadcasting information 212 of the fixed broadcasting information.

For example, the frame configuration unit 120 may set the paging message indicator 260 of the super-frame SU(m−1), to which the paging message 270 is allocated, to '1'. Moreover, the frame configuration unit 120 may set the paging message indicator 260 of the super-frames SU(m−2) and SUm, to which the paging message 270 is not allocated, to '0'. Then, the terminal determines whether the paging message 270 exists in the corresponding super-frame, through the fixed broadcasting information located on the header of the super-frame, that is, the primary broadcasting information 212. When the paging message 270 exists in the super-frame, the terminal receives the body of the super-frame SU(m−1) and receives the paging message 270 to confirm the paging information. When the paging message 270 does not exist in the super-frame, the terminal does not receive the body of the super-frame for the purpose of paging. Accordingly, it can reduce the load due to the confirmation of the paging information.

As described above, according to the embodiments of the present invention, the terminal can effectively acquire fixed broadcasting information, a broadcasting message, and a paging message.

The embodiment of the present invention can not necessarily only be implemented by the above-described apparatus and/or method, but can be implemented by, for example, a program that achieves the function corresponding to the configuration of the embodiment of the present invention and a recording medium in which the program is recorded.

Although embodiments of the present invention have been described in detail, the scope of the present invention is not limited hereto. Various changes and modifications using the principle of the present invention as defined in the appended claims are also included in the scope of the present invention.

What is claimed is:

1. A method of transmitting broadcasting information in a broadcasting information transmission apparatus, comprising:
   classifying the broadcasting information into first broadcasting information and second broadcasting information;
   transmitting the first broadcasting information at a fixed position of a super-frame; and
   transmitting the second broadcasting information in the form of a broadcasting message,
   wherein the first broadcasting information is classified into primary broadcasting information and secondary broadcasting information,
   wherein the primary broadcasting information includes same broadcasting information in a cell area,
   wherein the secondary broadcasting information includes same broadcasting information in a network area, and
   wherein the primary broadcasting information includes a low-order bit of a super-frame number, and wherein the secondary broadcasting information includes a high-order bit of the super-frame number.

2. The method of claim 1, further comprising:
   transmitting the primary broadcasting information to a first cycle; and
   transmitting the secondary broadcasting information to a second cycle that is longer than the first cycle.

3. The method of claim 2, wherein the first cycle corresponds to one super-frame, and
   the second cycle corresponds to a plurality of super-frames.

4. The method of claim 1, wherein the primary broadcasting information includes a version of the primary broadcasting information.

5. The method of claim 1, wherein the primary broadcasting information includes a version of the secondary broadcasting information.

6. The method of claim 1, further comprising:
   allocating the primary broadcasting information to each super-frame;
   dividing the secondary broadcasting information into a plurality of secondary broadcasting blocks; and
   allocating the plurality of secondary broadcasting blocks to a plurality of super-frames, respectively.

7. The method of claim 1, wherein the first broadcasting information includes a version of the second broadcasting information to be currently transmitted.

8. The method of claim 7, wherein the first broadcasting information includes a version of the second broadcasting information to be applied to a current super-frame.

9. The method of claim 8, wherein the first broadcasting information includes a version of a plurality of the second broadcasting information.

10. The method of claim 8, wherein the first broadcasting information includes a common version for a plurality of the second broadcasting information.

11. The method of claim 1, wherein the first broadcasting information includes an indicator for indicating a change of the second broadcasting information.

12. The method of claim 1, wherein the first broadcasting information includes a paging message indicator for indicating whether a paging message exists in the super-frame or not.

13. The method of claim 1, wherein the super-frame includes a plurality of frames,
   each of the frames includes a plurality of subframes, and the first broadcasting information is located in the first subframe of the super-frame.

14. A method of transmitting broadcasting information in a broadcasting information transmission apparatus, comprising:
   classifying the broadcasting information into primary broadcasting information and secondary broadcasting information;
   allocating the primary broadcasting information to each of super-frames;
   dividing the secondary broadcasting information into a plurality of secondary broadcasting blocks;
   allocating the plurality of secondary broadcasting blocks to a plurality of super-frames, respectively, and
   wherein the primary broadcasting information includes a low-order bit of a super-frame number, and wherein the secondary broadcasting information includes a high-order bit of the super-frame number.

15. The method of claim 14, wherein a header of each super-frame includes the primary broadcasting information and a corresponding one among the plurality of secondary broadcasting blocks.

16. The method of claim 14, wherein each super-frame includes a plurality of frames,
   each of the frames includes a plurality of subframes, and the primary broadcasting information and each of the secondary broadcasting blocks are located in the first subframe of a super-frame.

17. The method of claim 14, further comprising
   performing time division multiplexing on the primary broadcasting information and each of the secondary broadcasting blocks.

18. An apparatus for transmitting broadcasting information, comprising:
   a broadcasting information classification unit that classifies the broadcasting information into primary broadcasting information and secondary broadcasting information;
   a frame configuration unit that locates the primary broadcasting information and the secondary broadcasting information at a fixed position of a super-frame; and
   a frame transmitting unit that transmits the super-frame,
   wherein the primary broadcasting information includes same broadcasting information in a cell area,
   wherein the secondary broadcasting information includes same broadcasting information in a network area, and
   wherein the primary broadcasting information includes a low-order bit of a super-frame number, and wherein the secondary broadcasting information includes a high-order bit of the super-frame number.

19. The apparatus of claim 18, wherein the super-frame includes a plurality of frames,
   each of the frames includes a plurality of subframes, and the frame configuration unit locates the primary broadcasting information and the secondary broadcasting information on the first subframe of the super-frame.

20. The apparatus of claim 18, wherein the frame configuration unit performs time division multiplexing on the primary broadcasting information and the secondary broadcasting information.

21. The apparatus of claim 18, wherein the frame configuration unit locates the primary broadcasting information on every super-frame, divides the secondary broadcasting information into at least one block, and locates the at least one block on at least one super-frame.

* * * * *